Patented Apr. 10, 1945

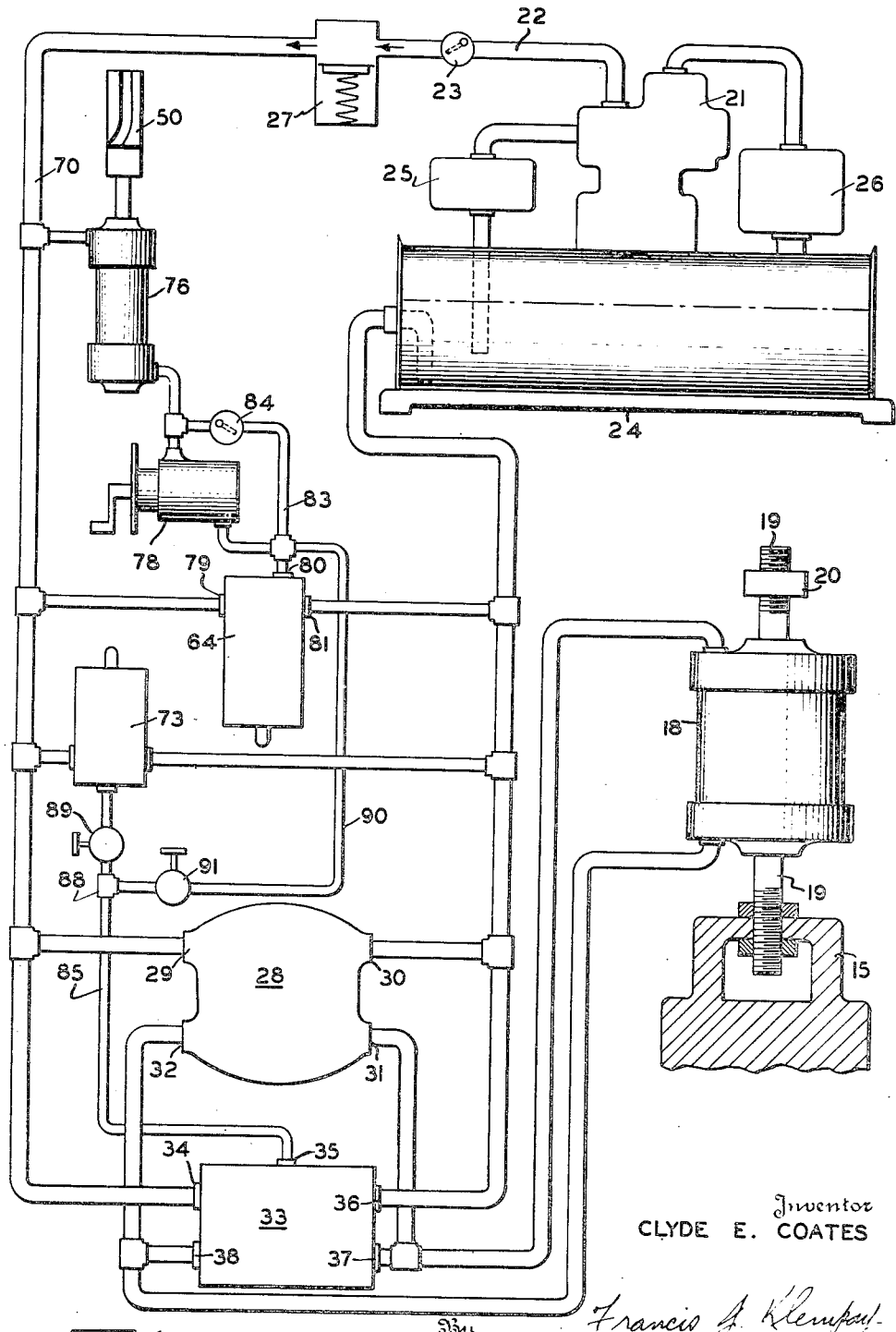

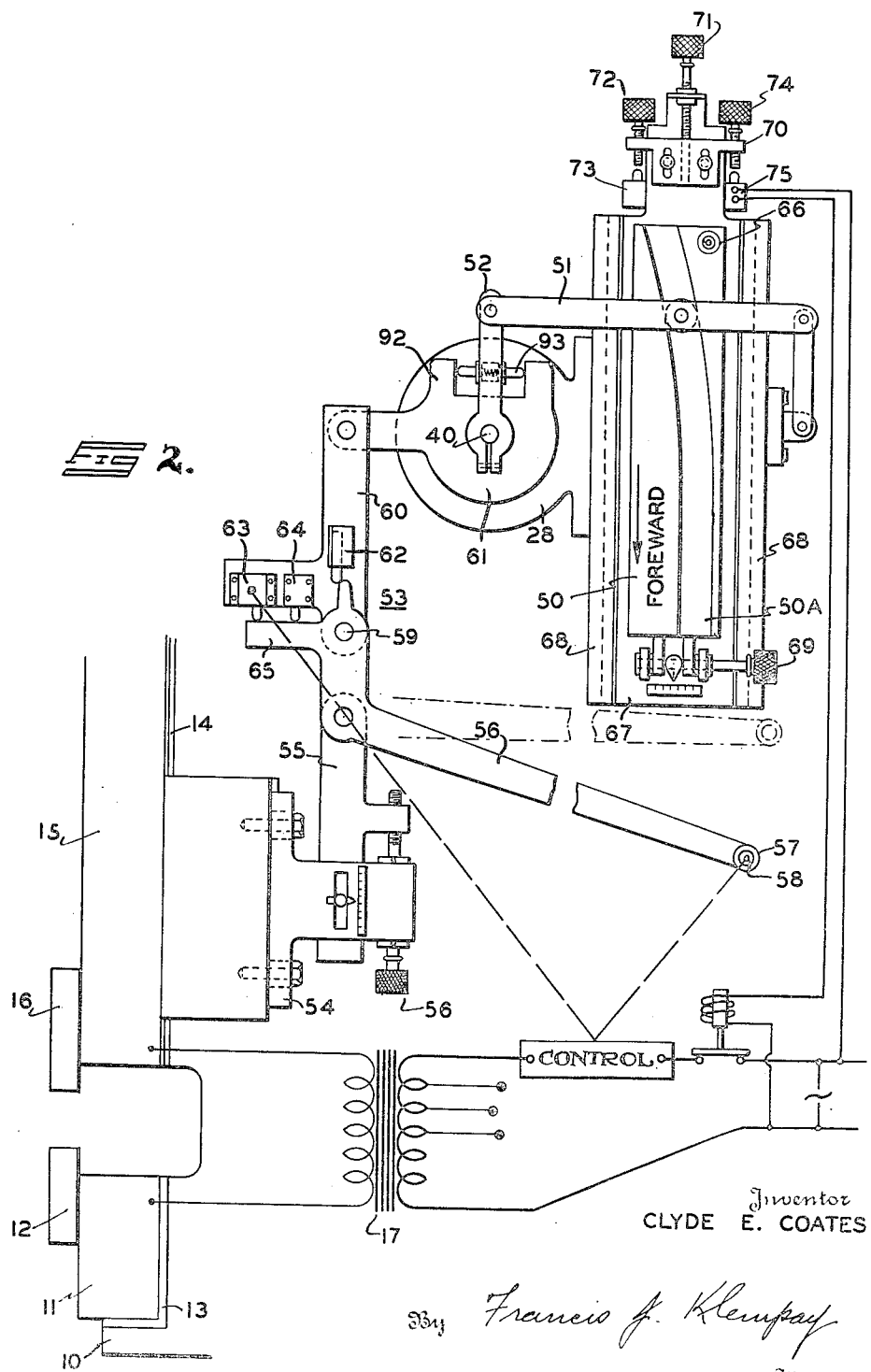

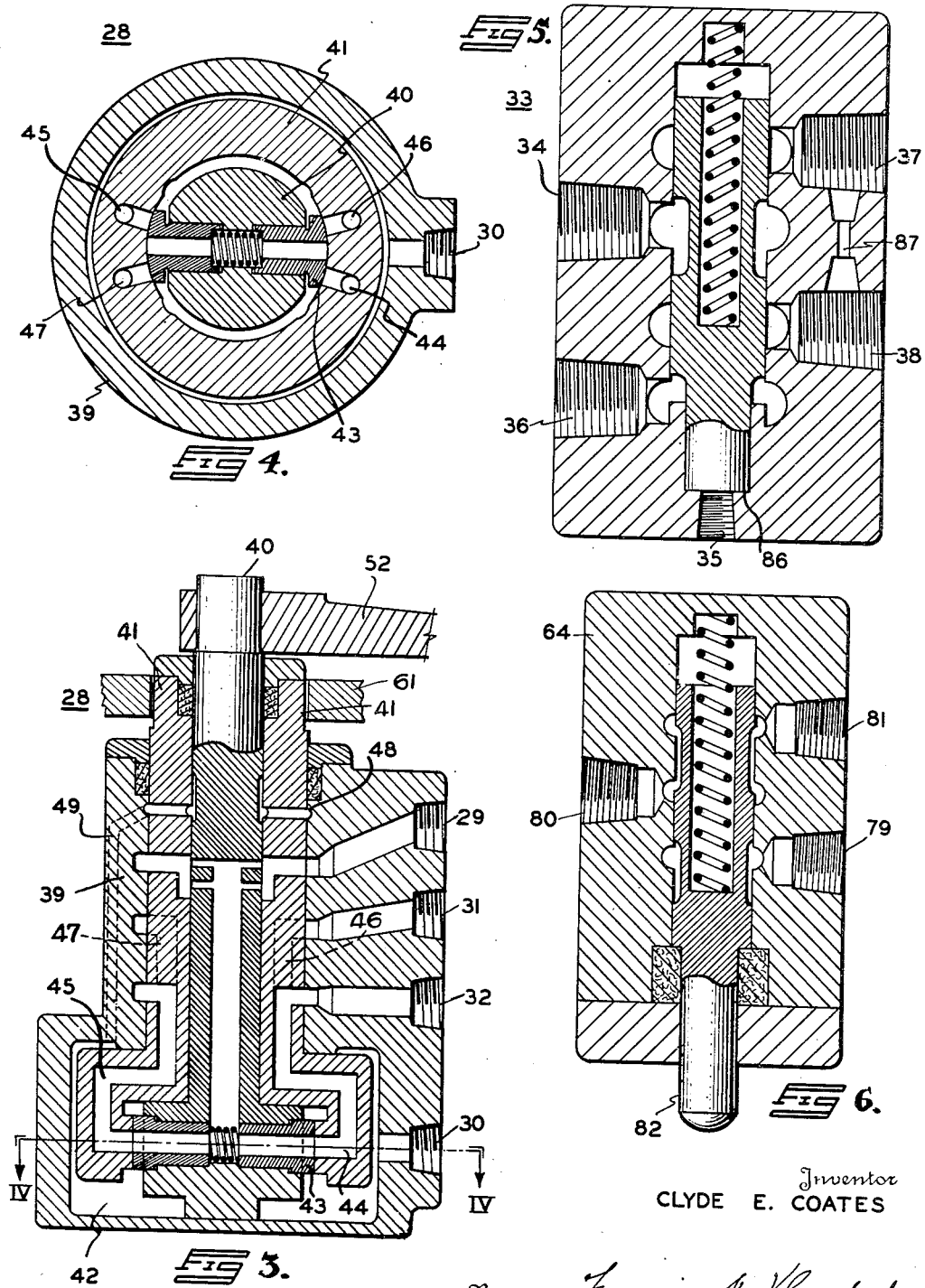

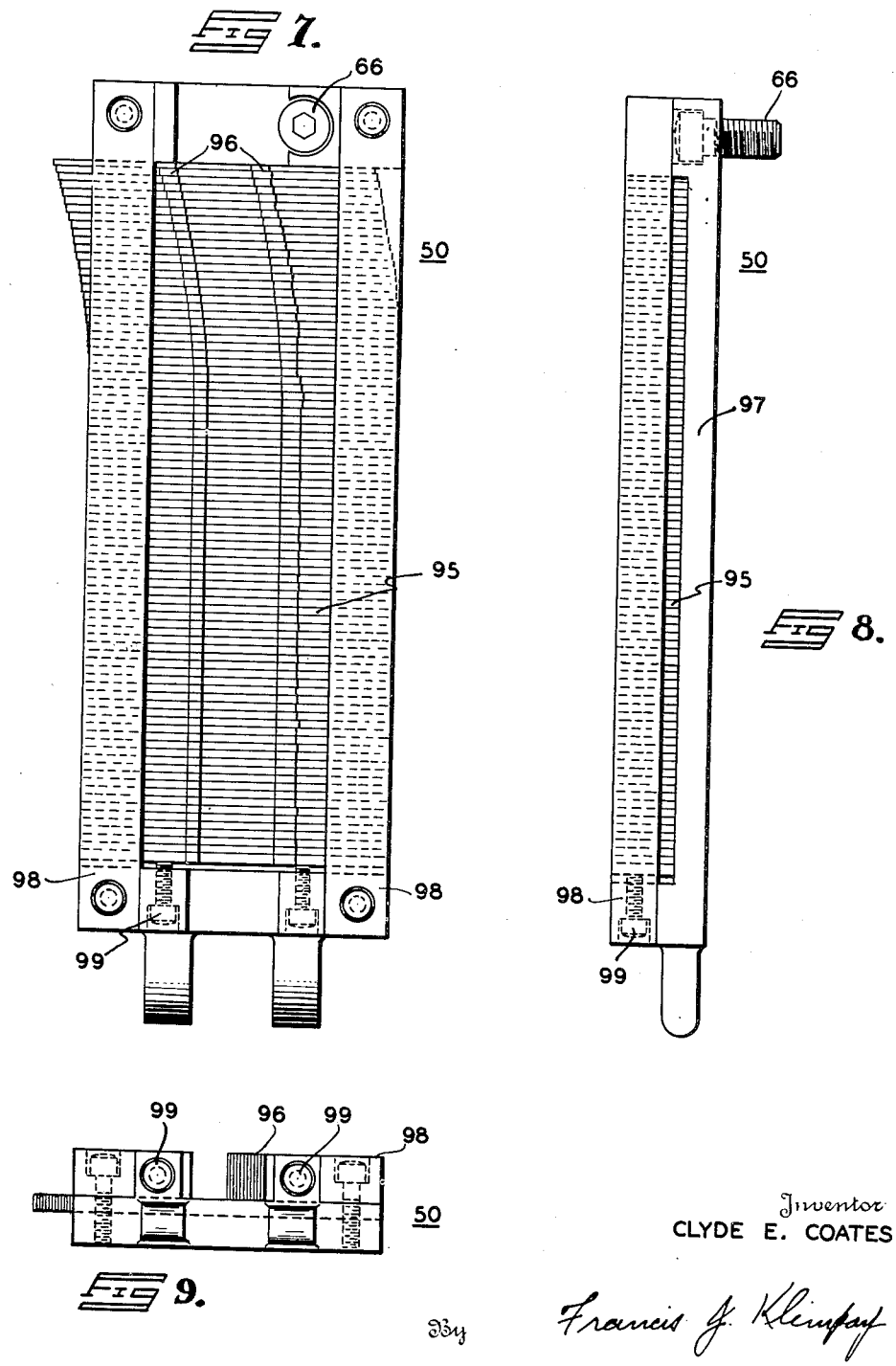

2,373,226

UNITED STATES PATENT OFFICE 2,373,226

HYDRAULIC BUTT WELDER CONTROL

Clyde E. Coates, Warren, Ohio, assignor to The Taylor-Winfield Corporation, Warren, Ohio, a corporation of Ohio Application February 18, 1942, Serial No. 431,364

22 Claims. (Cl. 219—4)

This invention relates to electric welding apparatus and more particularly to an improved method and apparatus for moving and controlling the movement of the movable platen of a butt flash welding machine. As is well understood in the art, such machines consist essentially of an insulated normally fixed paten having an electrode and means to clamp one of the pieces to be welded in or to this electrode, and a movable platen also provided with an electrode and stock clamping apparatus. The movable platen is suitably guided for sliding movement toward and away from the fixed platen and to accomplish such relative movement, an actuator such as a motor driven cam or one or more hydraulic cylinders are connected to the movable platen. For reasons of better operational characteristics and greater facility of control, the hydraulic moving means is much preferred and the present invention is concerned, in its more specific aspects, with the control of the flow of hydraulic fluid under pressure to the cylinder or cylinders operatively connected with the movable platen of the welding machine. The function of the control of the flow of hydraulic fluid to the platen moving cylinder or cylinders is to first move the platen forwardly at a predetermined rate of travel to effect and maintain the flashing between the edges of the stock pieces to be welded and to thereafter move the platen forwardly at a highly accelerated rate of travel to upset the edges of the stock pieces in effecting the weld. This required cycle of operation presents substantial difficulties particularly in the larger machines as, for example, in machines employed to butt weld wide metal strip since large quantities of fluid must be furnished the platen cylinder in a short length of time to effect the proper upsetting speed. Moreover this fluid must be maintained and delivered under very high pressure thus making the upsetting fluid load and demand many times greater than the supply required to effect the flashing. Heretofore the practice has been to employ the same valve to meter and control the flow of the fluid to the platen cylinder for both flashing and upsetting and since the valve was necessarily of large capacity to handle the required flow during upsetting, it was not possible to so operate it that the control could be effected with precision either automatically or semi-automatically. Consequently optimum control over the welding cycle was not attained and the apparatus parts were unduly cumbersome and expensive.

One of the objects of the present invention is the provision of an improved control system for governing the flow of fluid under pressure to the platen cylinder of a butt flash welding machine in which a separate valving arrangement is provided to effect the upsetting whereby the more critical follow valve provided to effect the flashing may be constructed and controlled with greater precision. This object is accomplished, in accordance with a preferred embodiment of the invention, by employing a large capacity dumping valve in addition to the follow valve heretofore employed for the purpose of transferring large volumes of fluid from a suitable source of supply, as from an accumulator, for example, to the platen cylinder in a short length of time to effect the desired quick movement of the movable platen at the optimum time for upsetting. Thus the follow valve need only be constructed of sufficient size and capacity to effect the flashing which, as stated above, requires but a relatively low rate of fluid flow.

Another object of the invention is the attainment of a wider diversity and greater accuracy in the control of the variables making up the above described general method of operation. For example the pattern of the rate of change of the movable platen during the flashing may be readily varied with respect to time and the interval between the cessation of flashing and the start of the upsetting may also be varied. This operation enables an independent adjustment of the current cut-off time with respect to the end of the flashing or upsetting period to be effected so that the cut-off can be delayed as desired. These variable factors enable a much higher degree of control over the welding operation to be exercised and thus contribute substantially to the quality of the work performed by the machine to which the control is applied.

A further object of the invention is the provision of an improved control system for a welding machine of the kind mentioned which facilitates the manual or semi-automatic control of the machine which is of particular advantage in setting up the machine and in welding non-uniform stock. The apparatus is so designed and constructed that the manual control of the entire operation may be effected normally by manipulation of a single lever and by reason of the arrangement and precision of the elements coupled with the lever, the operator can readily "feel" the character of movement of the platen and thus acquire finesse in operating the machine.

Yet another object of the invention is the provision of a control system of the character above outlined which facilitates and simplifies the setting up of the welding machine to perform a particular welding operation, particularly when the operation is to be periodically repeated under automatic control. This involves some means for readily changing the pattern of movement of the platen during flashing and, in accordance with a preferred embodiment of the invention, the same is accomplished by employing a controlling cam of variable pattern and special construction and equipping the apparatus with means to vary the effect produced by said cam once its pattern is selected and locked.

The above and other objects and advantages of the invention will become apparent from a consideration of the following detailed specification and the accompanying drawings wherein there is specifically disclosed a preferred embodiment of the invention.

In the drawings:

Figure 1 is a schematic representation of a hydraulically operated butt flash welder constructed in accordance with the principles of the invention;

Figure 2 is a detailed view of a portion of the control apparatus utilized in the preferred embodiment of the invention;

Figure 3 is a vertical section through the principal control valve of the apparatus:

Figure 4 is a horizontal section through the valve of Figure 3, the view illustrating the inner core of the valve rotated slightly from the position in which it is shown in Figure 3;

Figures 5 and 6 are longitudinal sections through a fluid pressure operated and a mechanical operated relay valve, respectively, utilized in the apparatus; and Figures 7, 8 and 9 are plan, side and end views, respectively, of a cam construction utilized in the preferred and illustrated embodiment of the invention.

Referring first to Figure 2 of the drawings reference numeral 10 indicates the main frame of a butt flash welding machine and reference numeral 11 designates a fixed platen carrying an electrode 12 which platen and electrode are insulated at 13 from the main body of the machine. Slidably mounted in suitable guides 14 is a movable platen 15 carrying an electrode 16. As is well understood in the art the pieces to be welded are rigidly clamped to the electrodes 12 and 16 by suitable mechanism carried by the respective platens. The heating and flashing current is supplied to the electrodes by a suitable tapped transformer 17.

Referring to Figure 1 movable platen 15 is arranged to be actuated by a hydraulic cylinder 18 which is rigidly attached to the frame of the machine and which has its piston rod 19 extending out of either end of the cylinder. One end of the rod 19 is arranged to be adjustably coupled to the platen 15, as shown, while the other end is threaded and provided with an adjustable nut 20, the purpose of which is to limit the inward movement of the platen 15 and consequently the final interval between the die electrodes 12 and 16.

Any suitable supply of fluid under pressure may be employed for operating the apparatus of the invention but for purposes of illustration a two-stage constant delivery pump 21 is shown as supplying fluid under pressure to a conduit 22 provided with a check valve 23. Pump 21 is supplied with fluid from a sump 24 through a filter 25 and, in accordance with established commercial practice, is provided with integral pressure relief valves which discharge through cooler 26 back into sump 24. Normally pump 21 is operated continuously and when there is no demand for fluid, its entire output is bypassed through cooler 26.

An accumulator 27, which may be of a spring loaded type, but is preferably of the air loaded type in the case of larger machines, is interposed in the fluid supply line, which line extends to a rotary follow valve 28 shown schematically in Figure 1 but in detail in Figures 3 and 4. Valve 28 is provided with an inlet port 29, an exhaust port 30, an outlet 31 through which fluid flows to move the platen 15 in a forward direction or in a direction toward the fixed platen, and an outlet port 32 through which fluid flows to move the platen in the reverse direction.

Fluid is also conducted from the accumulator 27 to the pressure inlet port 34 of a fluid pressure controlled dumping valve 33 shown schematically in Figure 1 but in detail in Figure 5. Valve 33 is provided with a control fluid inlet port 35, an exhaust port 36, an outlet port 37 through which fluid flows to move platen 15 forwardly, and an outlet port 38 through which fluid flows to move platen 15 backwardly.

Referring now to Figures 3 and 4, the rotary follow valve 28 comprises a housing 39 and inner and outer rotors 40 and 41, respectively, which are arranged to be independently rotated in a manner to be described hereinafter. Housing 39 is provided with an annular passage for and in communication with each of the ports 29, 31 and 32. The lower part of housing 39 is provided with an annular chamber 42 in communication with the exhaust port 30. Inner rotor 40 has a longitudinal passage with openings communicating at all times with openings through the side wall of outer rotor 41, which last named openings are in turn in vertical register with the annular groove which is in communication with the inlet port 29. The lower end of rotor 40 is enlarged and provided with diametrically opposed bores adapted to slideably receive the bored shoes 43 which are spring pressed outwardly, as shown, to engage a cylindrical surface formed in the lower portion of rotor 41. Rotor 41 is provided with diametrically opposed passages 44 and 45 which extend outwardly from the cylindrical surface aforesaid and up to the annular recess which communicates with port 32. Angularly spaced from passages 44 and 45 are the diametrically opposed passages 46 and 47 which extend from the cylindrical surface aforesaid to the annular recess in housing 39 which is coincident with the port 31. A groove 48 in housing 39 is aligned vertically with radially extending openings in rotor 41 and with a groove in rotor 40 to collect and drain off through passage 49 any fluid seepage which may occur. This prevents high pressure from reaching the packings of the valve.

With the parts of valve 28 relatively positioned as indicated in Figure 4, no fluid will flow since the openings through shoes 43 are blocked off. If the inner rotor is now turned counter-clockwise, fluid will flow from inlet port 29 through shoes 43 and passages 46 and 47 to outlet 31 to move the platen 15 in a forward direction. If it is assumed that the outer rotor 41 begins to move in the same direction shortly after the inner rotor is rotated, it will be apparent that when rotor 41 overtakes rotor 40 and the two rotors resume their relative positions shown in Figure 4, the flow of fluid will again cease. Operation in the reverse direction is identical and in either case it should be oserved that when the faces of shoes 43 are in position to supply fluid to one of the sets of passages 46, 47 or 44, 45, the passages of the other set are opened to the chamber 42 to allow the fluid to escape from the contracting end of the platen cylinder.

In accordance with the illustrated embodiment of the invention, the inner rotor 40 of valve 28 is arranged to be rotated by a slidably mounted cam 50 through a follower arm 51 and a lever 52 rigidly clamped to the rotor. The outer rotor of the valve 28 is arranged to be rotated upon sliding movement of the platen 15 through toggle linkage 53. For this purpose a bracket 54 is adjustably secured to the platen 15 and slidably mounted in this bracket is a bar 55. A vernier adjustment 56 enables a delicate and precise adjustment to be made of the longitudinal position of the bar 55 relative to the platen, a rough adjustment being provided by the adjustable connection between bracket 54 and the platen. Pivoted for rotation about a vertical axis on the outer end of bar 55 is a bell crank lever 56 having a hand grip portion 57 in which may be incorporated a thumb switch shown schematically at 58. The short leg of lever 56 is pivoted at 59 to a link 60 which in turn is pivoted to a disk 61 which is rigidly attached to the outer rotor 41 of the valve 28. Sufficient friction is provided in the pivotal connections of the lever 56 to prevent relative movement between parts 55, 56 and 60 unless the operator manipulates the lever 56.

Mounted on link 60 is a spring loaded latch 62 which holds the toggle in straightened out condition as shown in Figure 2 and also mounted on the link 60 is a switch 63 and a 3-way pilot valve 64, the operators of which are adapted to be engaged by a projection 65 of the lever 56. It should be apparent that if, in starting condition, the lever 56 is at rest in a position counterclockwisely rotated from its position shown in Figure 2, and if thereafter the lever is rotated in a clockwise direction, the toggle 53 will be extended and the switch 63 together with the valve 64 will be actuated. Also latch 62 will operate as indicated.

Cam 50, which is preferably constructed as shown in detail in Figures 7, 8 and 9, is pivotally mounted at 66 to a slide 67 which is guided in the fixed guide 68. A vernier adjustment 69 is provided to enable a final adjustment to be made of the angular relation between the cam and the slide. Slidably mounted on the slide 67 is an actuator carrier 70, the position of which may be minutely adjusted by the screw 71. Threadedly received in the carrier 70 is a screw 72 which is adapted to engage the operating plunger of and to operate a 3-way pilot valve 73. Carrier 70 also mounts a screw 74 which is arranged to actuate a switch 75.

Referring now to Figure 1, the slide carrying the cam 50 is moved by a cylinder 76 which has its rod end connected directly with the fluid supply line 70. The other end of the cylinder 76 is connected with the fluid supply line through the 3-way pilot valve 64 and an adjustable needle valve 78. Valve 64 has an inlet port 79, an outlet port 80 and a return port 81 and is shown in detail in Figure 6. It is provided with a plunger 82 and it should be apparent that upon the inward movement of the same the port 79 is connected with the port 80 to allow fluid to flow through the needle valve 78 and into the cylinder 76. When the plunger is retracted the port 80 communicates with port 81 to allow for the return flow of the fluid.

Bypassing valve 78 is a conduit 83 having a check valve 84 therein which allows a rapid return flow of the fluid. Correlating Figures 1 and 2, when the plunger in valve 64 is not engaged, the full line pressure acting on the rod end of cylinder 76 will move the piston to one end of the cylinder in which position the slide 67 (and the cam 50) will be in outer position with the follower on arm 51 at the end 50A of the cam 50. Upon actuation of plunger 82, fluid will be metered through valve 78 and by reason of the larger effective area of the piston in the adjacent end of cylinder 76, the cam 50 will be moved in the direction indicated in Figure 2 at a rate of speed determined by the setting of the valve 78.

Dumping valve 33 is arranged to be controlled by the 3-way pilot valve 73 which is identical in all respects with the pilot valve 64 shown in detail in Figure 6. The fluid outlet port of pilot valve 73 is connected with the control port 35 of the dumping valve 33 by a conduit 85. Valve 33 is provided with a spring return fluid pressure actuated plunger 86 and it should be apparent that when fluid pressure is applied to port 35 and the plunger is moved to inner position, the port 34 will be connected with port 37 and consequently large volumes of fluid may pass directly from the supply line 70 to the outer end of cylinder 18 to move the platen 15 rapidly. During this operation the large volume of fluid required is furnished by the accumulator 27. Also during this operation, port 38 is connected with port 36 to allow the fluid in the inner end of cylinder 18 to move rapidly to the sump 24. In practice, the passages through valve 33 are quite large and to prevent creepage of the platen a small bypass 87 is provided between ports 37 and 38.

Interposed in conduit 85 is a T fitting 88 and between fitting 88 and pilot valve 73 is a manual controlled valve 89. Interconnecting fitting 88 and the outlet port 80 of the pilot valve 64 is a conduit 90 in which is positioned a manually controlled valve 91.

Disk 61 which is rigidly connected with the outer rotor 41 of the valve 28 is provided with a yoke 92 within which is positioned the spring pressed thimbles 93 carried by the lever 52. The purpose of this balancing interconnection between the inner and outer rotors of the follow valve 28 is to normally maintain the rotors in their relative positions shown in Figure 4. With the parts assembled and in their relative positions in Figure 2, it should be apparent that upon continued movement of the cam 50 in the forward direction, the rotor 40 will be rotated counterclockwise and fluid pressure will be admitted to passages 46 and 47 and thence to port 31 to move platen 15 toward platen 11. As the platen 15 moves it rotates rotor 41 and when passages 46 and 47 are again closed off by the shoes 43 the movement stops. Thus the platen is normally caused to move at a rate of speed which is determined by the pitch of the portion of the cam 50 which at the instance is engaged by the follower on the arm 51. The cam is moved at a constant predetermined rate of speed as determined by the setting of the needle valve 78 and the advanced position reached by the platen 15 at any particular time is determined by the lateral position of that portion of the cam which is engaged by the follower at the time because of the interconnection between the platen and the outer control rotor 41 of the valve 28. Thus the position (or time) and velocity relationship of the cycle of movement of the platen 15 is controlled. It should be apparent that a very fine adjustment of the velocity of the platen may be achieved by manipulating the screw 69 which varies the angular relation of the cam 50 relative to its line of travel. To provide a wider range of adjustment or to vary the pattern of the time or position and velocity ratio, the cam is preferably constructed in the manner now to be described.

Referring now to Figures 7, 8 and 9, cam 50 is made up of a multiplicity of laminations 95 each consisting of a flat plate having spaced upwardly extending projections 96, the interval between which is substantially equal to the diameter of the cam following roller of the machine with which the cam is used. Laminations 95 are assembled on a plate 97 having an upwardly extending shoulder at either end thereof. The shoulders are notched at their ends to accommodate retaining bars 98 which are secured to the plate 97. Laminations 95 are clamped in position by screws 99 which extend through one of the shoulders of the plate 97. When the screws are tightened the laminations are rigidly held in their proper relative positions and, in practice, the cam is setup by employing a template to give the desired contour to the cam surface. It should be apparent that a wide variety of cam forms may be readily achieved and that by employing the proper template for the particular operation which the machine is set up to perform, the critical problem of securing the proper flashing movement of the platen is overcome. A bolt 66 pivotally mounts the cam on the carrier 67.

As is well understood in the art it is common flash welding practice to move the edges of the stock into engagement with each other and to allow current to flow therethrough to preheat the edges of the stock before the start of the welding cycle proper. This operation is preferably a manually controlled operation and the present invention enables it to be readily accomplished without disturbing any adjustments which are of a critical nature as regards the functioning of the welding cycle proper. In the illustrated embodiment thumb switch 58, when closed, starts the flow of current through the primary of transformer 17, switch 62 being in parallel with switch 58 and switch 75 being the current cut-off switch. Assume that the slide 15 is in retracted position, the operating lever 56 in the dotted line position of Figure 2, and the slide 67 in its initial starting position so that the follower is at the end 50A of the cam, movement of lever 56 in a clockwise direction rotates rotor 41 likewise and thus the edges of the stock clamped in the platens may be brought into engagement. The desired amount of preheating current is applied by closing switch 58 after which the switch is opened and the lever 56 moved oppositely to return platen 15 and all the parts to their initial starting positions to commence the start of the welding cycle proper.

With or without preheating the welding cycle is initiated by moving lever 56 clockwise from its dotted line position of Figure 2 and simultaneously closing switch 58. If the operation is to be entirely automatic, the operator moves the lever a sufficient amount to engage latch 62 and since switch 63 is in parallel with switch 58 and is closed when lever 56 is latched by 62, the operator may then release switch 58. Arm 65 of lever 56 also actuates pilot valve 64 which, as stated above, supplies fluid to cam cylinder 76 through needle valve 78 and the cam 50 now moves forward causing the slide 15 to move according to a predetermined pattern during flashing. The flashing time is, of course, determined by the setting of the metering valve 78 and when the cam carrier 67 reaches a predetermined advanced position, the screw operates pilot valve 73 which in turn operates dumping valve 33 to cause fluid to flow into cylinder 16 at a high rate to effect a quick upsetting of the highly heated edges of the stock held in the platens. At an adjusted interval after or before the beginning of the upsetting movement the screw 74 actuates switch 75 to cut off the flow of current to the welding transformer 17. After the work is unclamped from the electrodes, lever 56 is moved counterclockwise to open switch 63 and to release the plunger of pilot valve 64, which latter now connects its port 80 with its port 81 to allow fluid to move from the closed end of cam cylinder 76 through the check valve 84 and a conduit 83 back to the sump 24. Fluid enters the rod end of cylinder 76 to rapidly move the cam 50 outwardly to its initial starting position. As the cam 50 begins its outward or backward movement, the pilot valve 73 is released and plunger 86 of valve 33 is spring pressed outwardly to its normal position. Return movement of the platen 15 is controlled by the cam 50 which, of course, moves faster on its return stroke because the needle valve 78 is then bypassed by the line 83.

An important feature of the present invention is the attainment of flexibility but simplicity of control while retaining the primary advantage of the use of precision devices resulting in optimum performance characteristics. The control may be readily arranged for manual, semi-automatic, or full automatic operation, as desired. For manual operation, valve 89 is closed and valve 91 is opened thus placing the dumping valve 33 under the control of the pilot valve 64, which, of course, can be actuated at any time at the will of the operator by moving lever 56 a sufficient amount in a clockwise direction. Needle valve 78 is also closed for manual operation to prevent operation of the cam 50 so that the flashing movement is under the sole control of the operator through lever 56. For semi-automatic and automatic operation, the needle valve 78 is opened its proper amount, valve 89 is opened, and valve 91 is closed. In semi-automatic operation, the flashing or at least the initial part of the flashing phase of the cycle is manually controlled through lever 56 since cam cylinder 76 is not actuated until pilot 64 is engaged, but at any time in the phase the operator may throw lever 56 into latched position shown in Figure 2 and from then on the cycle is automatically controlled.

The final die (electrode) interval or dimension is determined by the setting of nut 20 and the initial die opening is determined by (a) the lateral position of the cam groove at end 50A and (b) the adjusted position of the bracket 54 and the adjustment 56. The flashing interval is determined by (a) the shape and/or angular disposition of the cam 50, and (b) the adjustments 71 and 72. The upsetting interval is, of course, the distance remaining and this interval may be adjusted, per se, roughly by moving the bracket 54 or finely by vernier adjustment 56. Screw 71 provides a coarse adjustment of the flashing and the current cut off points and these variables may be individually adjusted by the screws 72 and 74. It should be apparent that this arrangement enables the current to be cut off when desired after the start of the upsetting movement. The arrangement also enables an adjustable time delay to be effected between the start of the upsetting and the time of current cut off which feature has, in certain welding operations, been proven quite desirable.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. In a flash welder having a normally fixed platen and a movable platen, means to control the movement of the movable platen during the welding cycle comprising in combination a source of hydraulic fluid under pressure, a fluid pressure operated motor for moving said movable platen, a follow-up valve means for metering the flow of fluid from said source to said motor, said valve means having two relatively movable valve elements one of which is adapted to be connected to said movable platen, means to control the movement of the other of said valve elements in such manner that the movement of said platen will follow a predetermined position-speed relationship during the flashing period of said cycle, a second valve in parallel with said first valve and being operative to conduct quickly a relatively large volume of fluid from said source to said motor, and means to actuate said second valve after the termination of said flashing period to effect the upsetting of the edges of the pieces to be joined.

2. In a flash welding machine having a normally fixed platen and a movable platen, a source of hydraulic fluid under pressure, a fluid pressure operated motor for moving said movable platen during the welding cycle, a follow-up valve means for metering the flow of fluid from said source to said motor to effect movement of the movable platen during the flashing period of the welding cycle, said valve means having two relatively movable valve elements one of which is adapted to be connected to said movable platen, a time controlled cam in control of the movement of the other of said valve elements to effect a predetermined time-position relationship in said movement, a second valve to quickly pass a relatively large volume of fluid to said motor to effect a quick upsetting movement in said movable platen, and means responsive to a predetermined advanced position of said cam to actuate said second valve.

3. In a flash welder having a normally fixed platen and a movable platen, a source of hydraulic fluid under pressure, a fluid pressure operated motor connected to said movable platen for moving the same, a valve having two relatively movable elements for metering the flow of fluid from said source to said motor, one of said elements being adapted to be moved in synchronism with said platen while the other of said elements is arranged to be moved by a control member, the arrangement being such that said movable platen follows the movement of said control member, a second valve in parallel with said first mentioned valve and being operative to quickly pass a relatively large volume of fluid from said source to said motor to effect a quick upsetting movement in said movable platen, and means responsive to the advanced position of said control member to actuate said second valve.

4. In a flash welder having a normally fixed platen and a movable platen, a fluid pressure operated motor connected to the movable platen for moving the same, a follow-up valve for metering the flow of fluid to said motor to impart movement to said movable platen during the flashing period of the welding cycle, said valve being mechanically coupled with said platen and with a movable control member whereby the platen will follow the movement of said control member, a time controlled device for moving said control member, a second valve in parallel with said differential valve and of larger capacity than said differential valve to quickly pass a relatively large volume of fluid to said motor, and means to actuate said second valve upon said platen reaching a predetermined advanced position.

5. Apparatus for moving the movable platen in a flash welding machine comprising a fluid pressure operated motor operatively connected to said platen and a source of hydraulic fluid under pressure, means to control the flow of fluid from said source to said motor comprising a follow-up valve having two controlling elements one of which is connected with said movable platen, a time controlled cam connected with the other of said movable elements, a dumping valve in parallel with said follow-up valve, and means responsive to the advanced position of said cam to open said dumping valve whereby a large quantity of fluid is transferred from said source to said motor to effect a quick upsetting movement of said platen.

6. Apparatus according to claim 5 further including an adjustable linkage between the said one of said elements and the movable platen, said linkage including a manually operable lever whereby the follow-up valve may be actuated to effect movement of said platen independently of movement of said cam.

7. Apparatus according to claim 5 further including an adjustable linkage between the said one of said elements and said platen, said linkage including a manually operable lever whereby the follow-up valve may be actuated to move said platen independently of movement of said cam, means to move said cam, and means responsive to the relative position of said lever in said linkage in control of the means to move said cam.

8. Apparatus for controlling the movement of the movable platen of a flash welding machine having a fluid pressure operated motor connected with said platen and a source of hydraulic fluid under pressure comprising in combination a valve to meter the flow of fluid to said motor to effect movement of said platen during the flashing period of the welding cycle, a manually controlled lever to actuate said valve, a dumping valve in parallel with said first mentioned valve to transfer fluid to said motor at a substantially higher rate to effect a quick upsetting movement of said platen, and means actuated upon said lever reaching an advanced position to open said dumping valve.

9. Apparatus for controlling the movement of the movable platen of a flash welding machine having a fluid pressure operated motor connected with said platen and a source of hydraulic fluid under pressure comprising in combination a valve to meter the flow of fluid to said motor to effect movement of said platen during the flashing period of the welding cycle, a manually operable bell crank lever pivotally connected to said platen and having its short leg pivotally connected with a link coupled with said valve, a dumping valve in parallel with said first mentioned valve to transfer fluid to said motor at a substantially higher rate to effect a quick upsetting movement of said platen, and means actuated upon continued rotation of said lever in one direction to open said dumping valve.

10. Apparatus according to claim 9 further including means to vary the longitudinal position of said first mentioned pivotal connection relative to said platen whereby the position ultimately reached by said platen may be predetermined.

11. Apparatus for controlling the movement of the movable platen of a flash welding machine having a fluid pressure operated motor connected with said platen and a source of hydraulic fluid under pressure comprising in combination a follow-up valve to meter the flow of fluid to said motor during the flashing period of the welding cycle, said valve comprising two relatively movable rotors, a movable cam to rotate one of said rotors according to a predetermined time-position pattern, a toggle linkage connecting the other of said rotors with said platen and including a manually engageable lever, a resilient balancing interconnection between said rotors, means to move said cam at a predetermined rate of travel, means to latch said lever in a predetermined relative position, and means operable when said lever is in latched position to actuate said means to move said cam.

12. Apparatus according to claim 11 further including a dumping valve in parallel with said first mentioned valve to effect a quick upsetting movement of the said platen, and means responsive to the advanced position of said cam to open said dumping valve.

13. Apparatus according to claim 11 further including a switch arranged to be actuated when said lever is in latched position and adapted to maintain the flow of welding current to said platen, and a second switch arranged to be actuated upon said cam reaching a predetermined position to interrupt the flow of welding current.

14. Apparatus for controlling the movement of the movable platen of a flash welding machine having a fluid pressure operated motor connected with said platen and a source of hydraulic fluid under pressure comprising in combination a follow-up valve to meter the flow of fluid to said motor to effect the movement of said platen, said valve comprising relatively movable control elements one of which is connected with said platen through linkage means, a manually engageable control lever to vary the effective length of said linkage means, means to move the other of said elements comprising a movable cam adapted to be moved at a consstant predetermined rate of travel to effect a predetermined time-position pattern in the movement of said platen, and means to vary the pattern of said cam.

15. Flash welding apparatus having a movable platen, a source of fluid under pressure, a fluid pressure operated motor connected to said platen, a follow-up valve for metering the flow of fluid to said motor to effect flashing movement in said platen, a dumping valve in parallel with said follow-up valve to effect a quick upsetting movement in said platen, means to actuate said follow-up valve according to a predetermined time-position pattern, a manual control lever, means responsive to a restricted movement of said lever to actuate said follow-up valve independently of said time-position means, means responsive to further movement of said lever to actuate said time-position means, means normally responsive to the advanced movement of said last mentioned means to open said dumping valve, means to render said time-position means inoperative, and means to render said means responsive to the further position of said lever operative to open said dumping valve.

16. In flash welding apparatus having a movable platen and means to supply welding current thereto the combination of means to move said platen at a relatively slow rate of movement during the flashing period of a welding cycle and to thereafter impart a quick upsetting movement to said platen, means to interrupt the flow of welding current, means to actuate said interrupting means in timed relation with respect to the time of the beginning of said upsetting movement, and means to vary the time interval between said interruption and said initiation of upsetting movement.

17. Apparatus for controlling the movement of a movable platen of a flash welding machine having a fluid pressure operated motor connected with said platen and a source of fluid under pressure comprising in combination a follow-up valve means to meter the flow of fluid under pressure to said motor, said valve means having a movable control element, a manually engageable lever for moving said control element, said lever being pivotally mounted on said movable platen, said valve means having a second movable control element arranged to coact with said first mentioned element, and means to move said second element according to a predetermined position-time pattern.

18. Apparatus for controlling the movement of a movable platen of a flash welding machine having a fluid pressure operated motor connected with said platen and a source of fluid under pressure comprising in combination a follow-up valve means to meter the flow of fluid to said motor and having a movable valve control element, an operating link connected to said element, a manually engageable lever pivotally connected to said movable platen and having a portion mechanically connected with said link, said valve means having a second valve control element arranged to coact with said first mentioned control element, means to move said second control element according to a predetermined position-time pattern, and means operative upon said lever reaching a predetermined advanced position to initiate the operation of said means to move said second element.

19. Apparatus according to claim 18 further including means to supply welding current to said platen, and means operative upon said second mentioned element attaining a predetermined advanced position to interrupt the flow of current to said platen.

20. Apparatus according to claim 18 further including means to adjust the position of said pivotal connection on said platen in a direction parallel with the path of movement of said platen.

21. In butt-flash welding apparatus having a movable platen and a fluid pressure operated motor connected with said platen for moving the same the combination of means to control the flow of fluid under pressure to said motor comprising a follow-up valve having a movable control member, means to move said control member, said follow-up valve having a second control member adapted to be moved relative to said first mentioned control member, a toggle interconnecting said second control member and said movable platen, and an operating handle rigidly connected with one of the links of the toggle.

22. In a flash welding machine having a movable platen and a fluid pressure operated motor connected to said movable platen, a source of fluid under pressure, an accumulator for storing fluid under pressure received from said source, a follow-up valve interconnecting said accumulator with said motor to provide a controlled movement of said platen during the flashing portion of the welding cycle, a dumping valve in parallel with said first mentioned valve to quickly transfer a large volume of fluid from said accumulator to said motor to provide for a quick upsetting movement of said platen, and means operative upon the completion of predetermined flashing movement of said movable platen to actuate said dumping valve.

CLYDE E. COATES.